United States Patent [19]

Kawabe

[11] Patent Number: 5,308,020
[45] Date of Patent: May 3, 1994

[54] FISHING REEL

[75] Inventor: Yuzo Kawabe, Izumi, Japan

[73] Assignee: Shimano Inc., Osaka, Japan

[21] Appl. No.: 760,334

[22] Filed: Sep. 16, 1991

[30] Foreign Application Priority Data

Oct. 11, 1990 [JP] Japan .............................. 2-107070[U]

[51] Int. Cl.$^5$ .............................................. A01K 89/01
[52] U.S. Cl. ......................................... 242/284; 74/546
[58] Field of Search ................ 242/283, 284; 74/545, 74/546, 547

[56] References Cited

U.S. PATENT DOCUMENTS

| | | | |
|---|---|---|---|
| 2,766,956 | 10/1956 | Sarah .................................. | 242/284 |
| 2,863,617 | 12/1958 | Chapin et al. ..................... | 242/284 |
| 3,606,193 | 9/1971 | Allred ................................ | 74/546 |
| 3,948,117 | 4/1976 | Kimura .............................. | 242/284 |
| 4,368,856 | 1/1983 | Neufeld ............................. | 242/284 |

FOREIGN PATENT DOCUMENTS

| | | | |
|---|---|---|---|
| 1290971 | 3/1962 | France ............................... | 242/284 |
| 0411216 | 3/1947 | Italy ................................... | 242/284 |
| 54-36075 | 10/1979 | Japan . | |

Primary Examiner—Katherine Matecki
Attorney, Agent, or Firm—Dickstein, Shapiro & Morin

[57] ABSTRACT

A fishing reel has a handle shaft, a movable member movable along an axis of the handle shaft, and a handle projectable and retractable relative to the movable member in a direction normal or substantially normal to the shaft axis. The reel further includes a handle-length adjusting mechanism engageable or pressure-contactable with the movable member or a further member movable relative to the movable member when the movable member is moved along the shaft axis thereby to prevent a projecting/retracting movement of the handle.

5 Claims, 5 Drawing Sheets

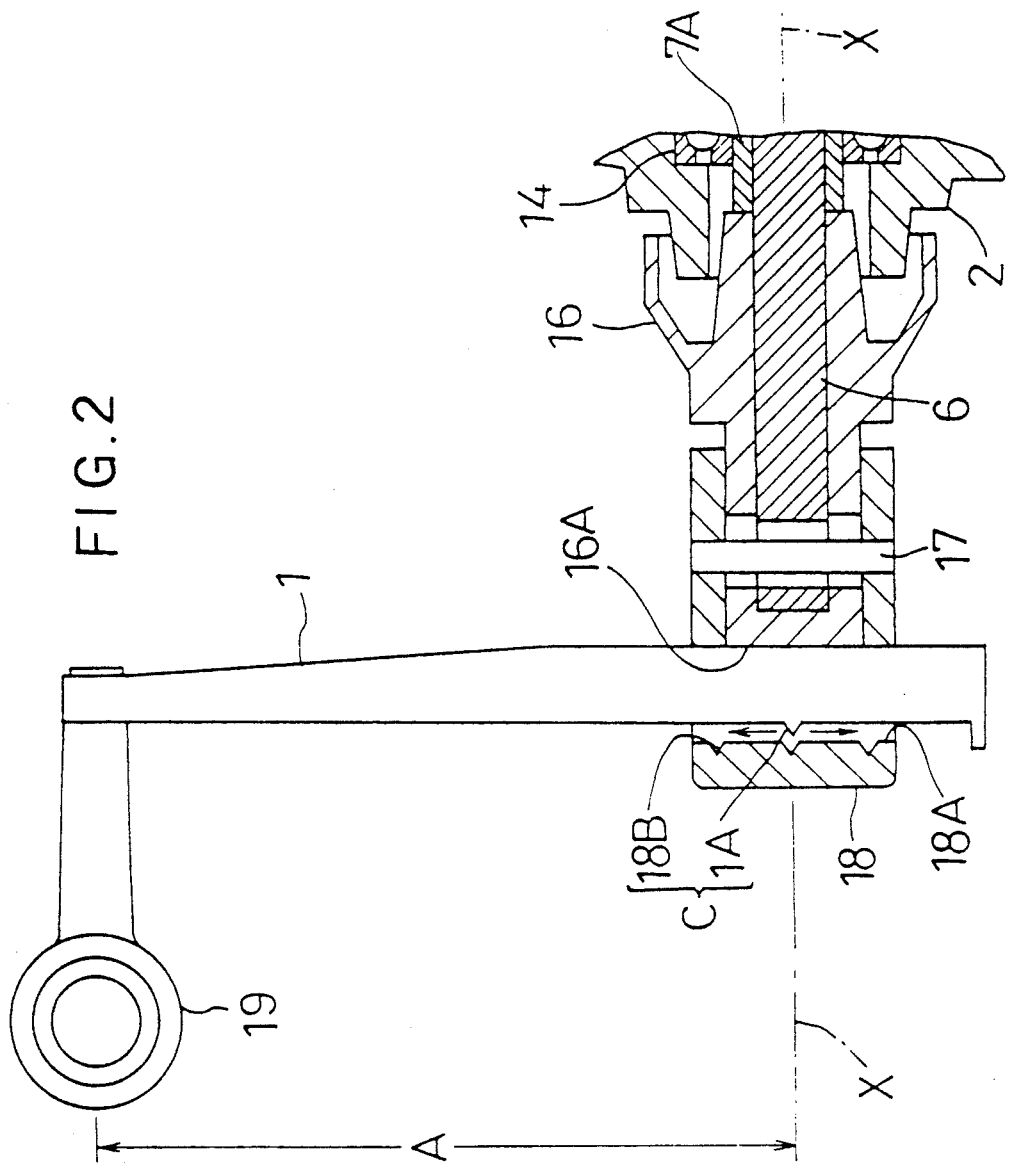

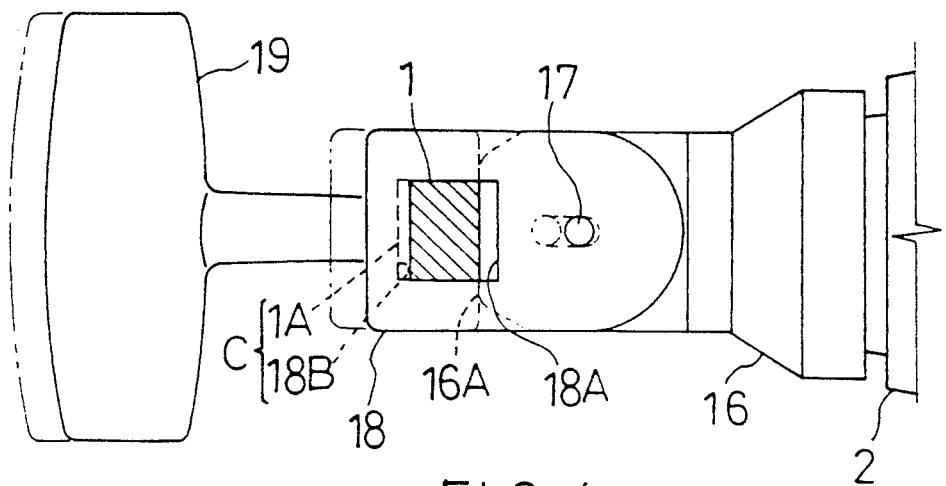
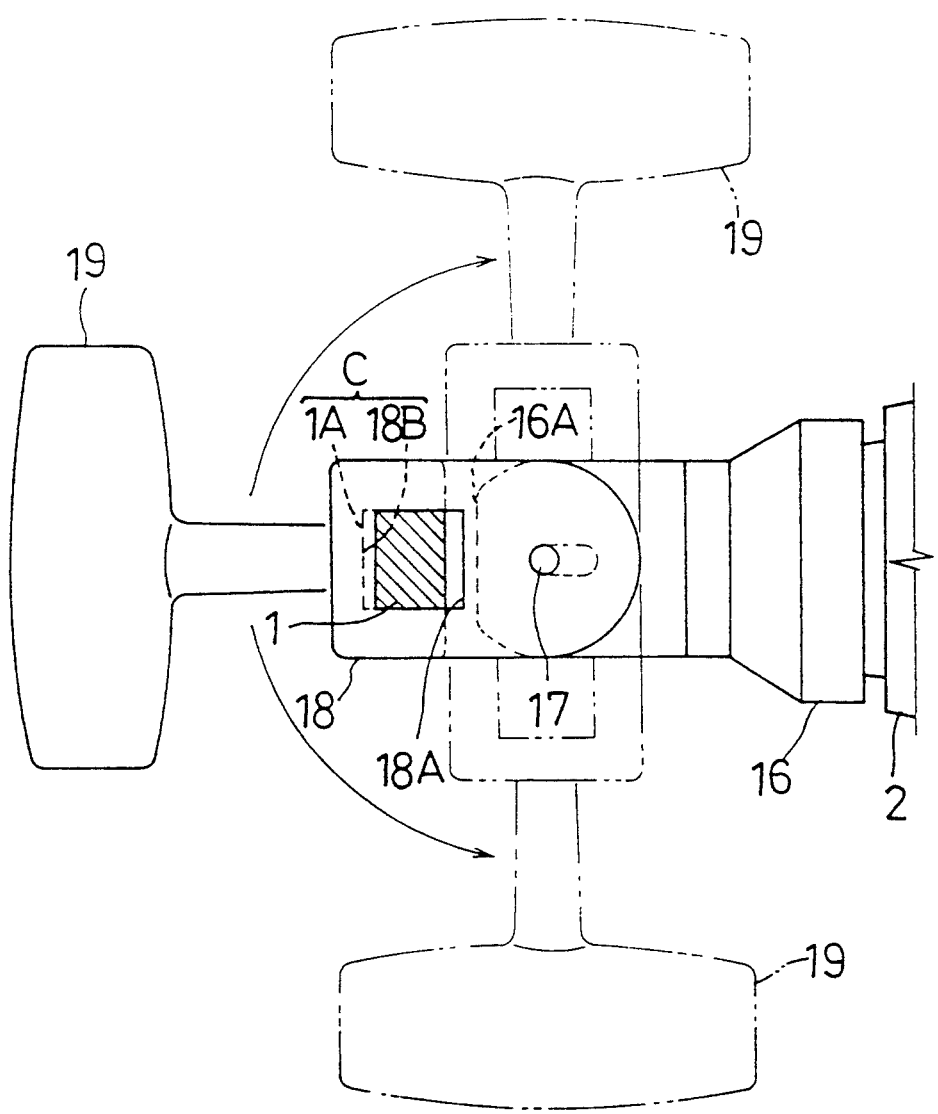

FISHING REEL

BACKGROUND OF THE INVENTION

1. Field of the Invention

The present invention relates to a fishing reel, and more particularly to a construction for adjusting an arm length of a reel handle for taking up a fishing line.

2. Description of the Related Art

A construction of the above-noted kind is known from e.g. Japanese published utility model gazette No. 54-36075. According to this convention, an arm of the handle is rendered projectable and retractable relative to a member rotatable in unison with a handle shaft. The construction further includes an engaging pin for retaining the handle arm which is set at an appropriate projecting or retracting position and for preventing the handle arm from moving in the projecting/retracting direction.

With the above convention, the handle is supported through the engaging pin to the member rotatable with the handle shaft. Therefore, the adjustment of the projecting/retracting amount can be easily done by operating the engaging pin. On the other hand, when the handle is subjected to a force in the projecting or retracting direction due to a rotating operation of the handle, the force is applied in a concentrated manner to the engaging pin. As a result, mechanical looseness tends to occur. That is, the conventional construction has room for improvement in terms of strength.

The primary object of the present invention is to provide an improved fishing reel which allows easy operation for adjusting a projecting/retracting amount of the handle arm and yet which can firmly hold the handle after the adjustment.

SUMMARY OF THE INVENTION

For accomplishing the above-noted object, a fishing reel, according to the present invention, comprises:
a handle shaft;
a movable member movable along an axis of said handle shaft;
a handle projectable and retractable relative to said movable member in a direction normal or substantially normal to said axis; and
a handle-length adjusting mechanism engageable or pressure-contactable with said movable member or a further member movable relative to said movable member when said movable member is moved along said axis thereby to prevent a projecting/retracting movement of said handle.

Functions and effects of these features will be described next.

These features can be embodied as shown in FIGS. 1 and 2, for example. With this construction, first, a screw element 15 is loosened to render a movable member 18 movable in a direction away from a handle shaft 1. Then, in this state, the movable member 18 is manually moved in the mentioned direction, so that a handle-length adjusting mechanism C releases its engagement with the handle 1 for enabling free setting of a projecting/retracting amount of this handle 1. On the other hand, if the screw element 15 is tightened, the movable member 18 comes into direct contact with the handle 1 thereby to prevent the movement of the handle 1 in the projecting/retracting direction.

That is, the invention's construction does without any intermediate member such as the engaging pin used in the afore-described convention. Accordingly, the invention's construction can effectively resist occurrence of mechanical looseness due to the application of force to the handle 1. Further, the construction retains the ease of arm length adjusting operation since the adjustment is made possible simply through movement of the movable member 18.

As described above, the invention has fully achieved its intended object of providing an improved fishing reel which allows easy operation for adjusting a projecting/retracting amount of the handle arm and yet which can firmly hold the handle after the adjustment.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a fishing reel relating to the present invention; in which, FIG. 2 is a section showing the handle unit under an unlocked state, FIG. 3 shows a pivot mechanism for the handle under the locked state, FIG. 4 shows the handle pivot mechanism under the unlocked state.

DESCRIPTION OF THE PREFERRED EMBODIMENTS

Preferred embodiments of a fishing reel relating to the present invention will now be described in particular with reference to the accompanying drawings.

Figure 5:
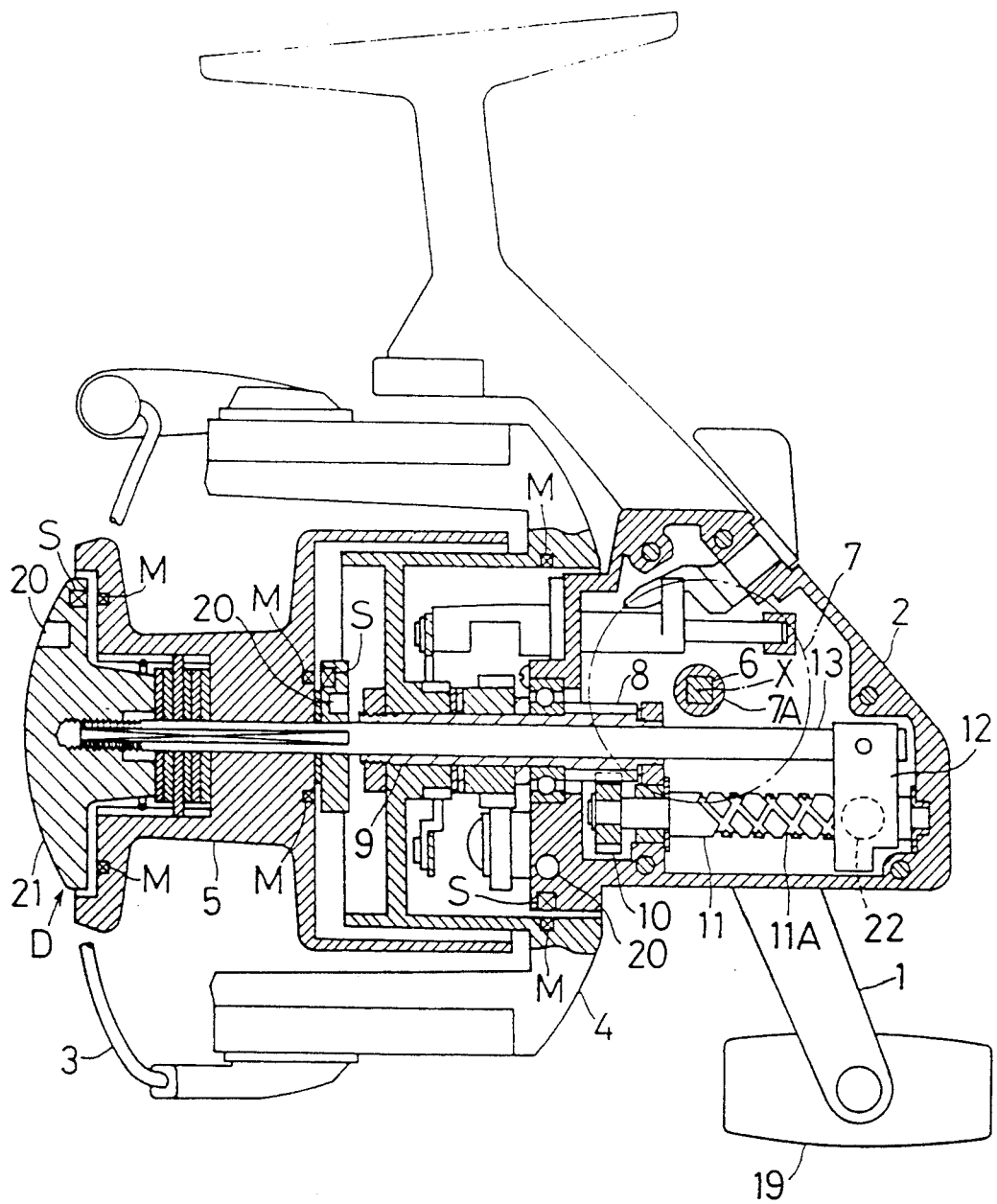
FIG. 5 is a side view in vertical section of a spinning reel.

A fishing reel according to one preferred embodiment of the invention is shown in FIG. 5. As shown, this reel is constructed as a spinning reel including a reel body 2 having a handle 1, a rotor 4 having a bail 3 and a spool 5 both attached to front portions of the reel body 2. The reel further includes a line takeup transmission mechanism for transmitting a rotational force of a handle shaft 6 through a drive gear 7, a pinion gear 8, a cylinder shaft 9 to the rotor 4 for taking up a fishing line and an oscillating mechanism for converting the rotational force of the pinion gear 8 into a reciprocating force through an input gear 10, a worm shaft 11 and a slide element 12 and then transmitting this reciprocating force to a spool shaft 13.

Figure 1:
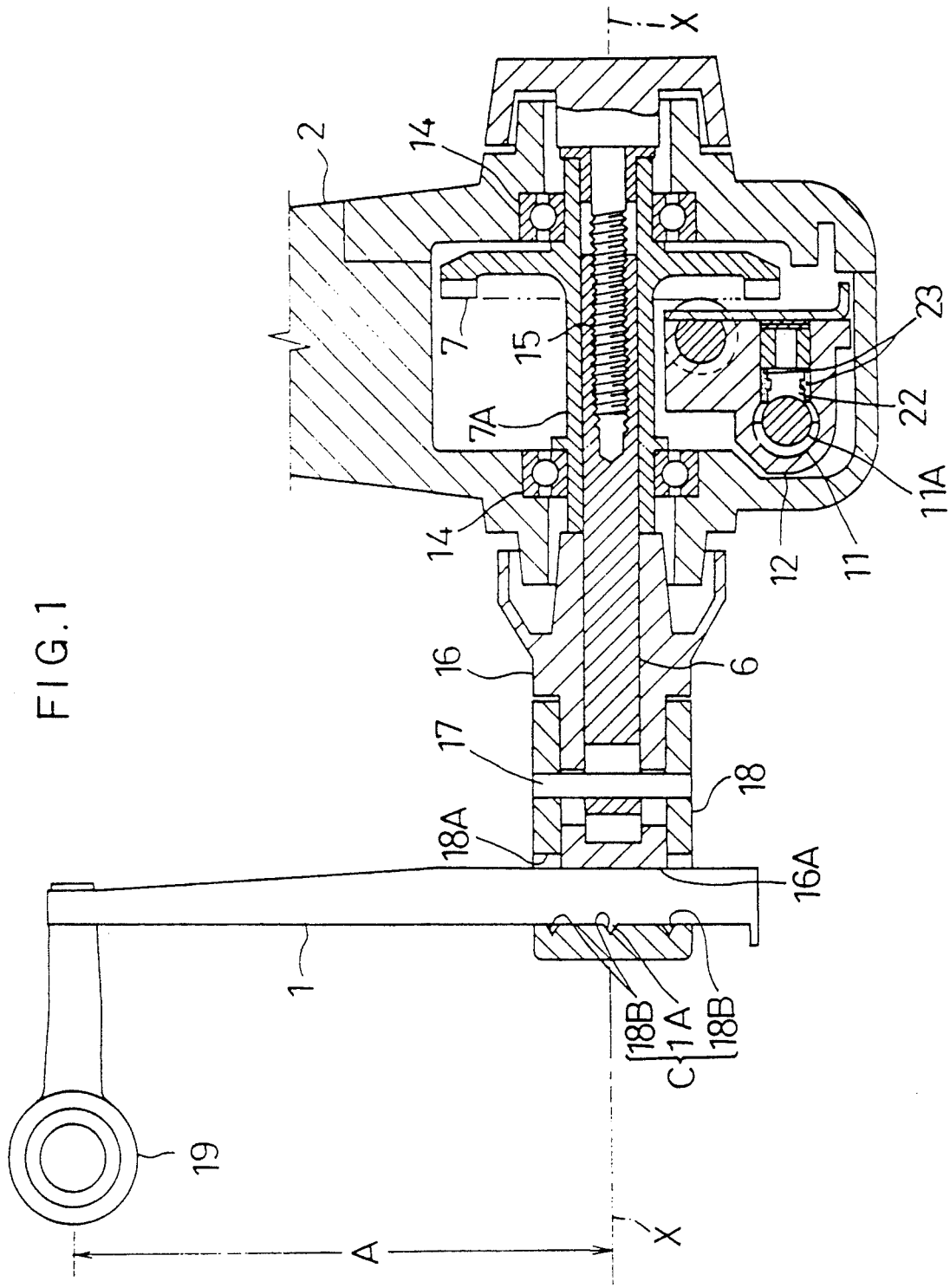
FIG. 1 is a section showing a handle and other members associated therewith under a locked state.

As shown in FIG. 1, the drive gear 7 is supported to the reel body 2 through a pair of bearings 14, 14. The handle shaft 6 is unwithdrawably fitted into a cylinder portion 7A of the drive gear 7 by means of a screw element 15.

On the other hand, on the opposite side to the screw element 15, the handle shaft 6 mounts a sleeve 16 and a movable member 18 pivotably supported on the shaft 6 through a pin 17. The handle 1 is rendered projectable and retractable along an opening 18A of the movable member 18. Further, a projection 1A formed on the handle 1 and a plurality of engaging portions 18B formed in the movable member 18 together constitute a handle-length adjusting mechanism C.

In this spinning reel, when the screw element 15 is rotated in a loosening direction, as illustrated in FIG. 2, pressure contact between a pressure-contact portion 16A of the sleeve 16 and the handle 1 is released. Further, through release of engagement between the projection 1A and the engaging portions 18B, it becomes possible to adjust an arm length A of the handle 1. Simultaneously, as illustrated in FIGS. 3 and 4, the movable member 18 is pivoted about the pin 17 to allow storage of the handle 1.

Incidentally, the arm length A corresponds to a distance between an axis X of the handle shaft 6 and a grip 19 of the handle 1. This arm length A is stepwise adjustable according to a pitch of the engaging portions 18B. Then, when the screw element 15 is rotated in a tightening direction, as shown in FIG. 1, the pressure contact between the handle 1 and the pressure-contact portion 16A stabilizes the posture of the movable member 18 and the handle length adjusting mechanism C is brought into a firmly engaged state.

Further, as shown in FIG. 5, in this spinning reel, click-sound generating devices each consisting essentially of a magnet M, a sensor S and a micro speaker 20 are provided at three appropriate positions. The device disposed at a forward position generates a click sound when a knob 21 of a drag mechanism D is operated. Another device disposed inside the spool generates the sound in association with rotation of the spool 5. The other device disposed inside the rotor 4 generates the sound in association with rotation of the rotor 4.

The slide element 12 accommodates therein, as shown in FIG. 1, a follower member 22 engageable with a worm groove 11A defined in the worm shaft 11. At an outer edge of threaded portion of this follower member 22, there is provided a buffer element 23 for reducing contact noise generated through contact with the slide element 12.

Figure 6:
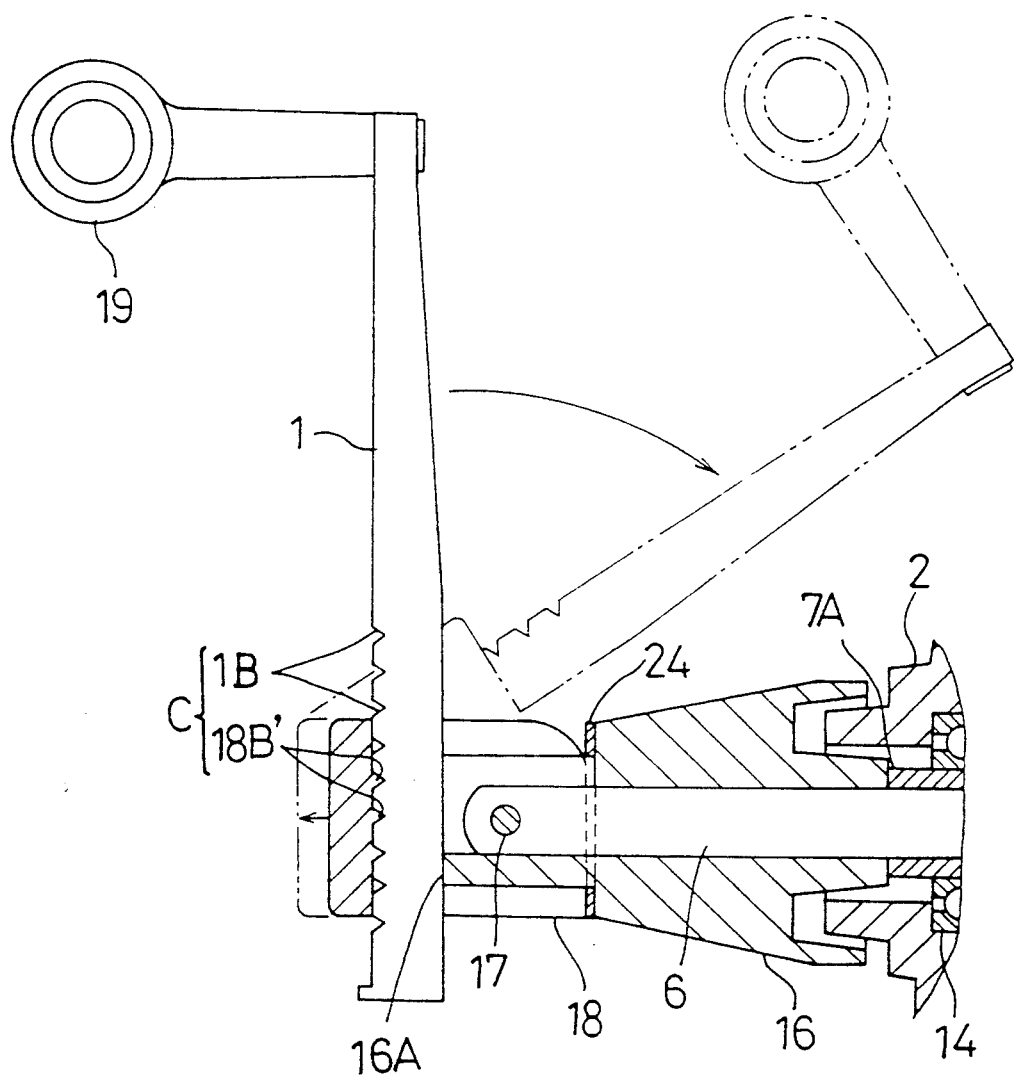
FIG. 6 is a section of a handle unit relating to a further embodiment.

In addition to the above-described construction, the present invention can be embodied as shown in FIG. 6. In this alternate construction, the handle 1 includes a plurality of concave portions 1B. On the other hand, the movable member 18 includes, as its engaging portions 18B', a plurality of projections engageable with the concave portions 1B. Further, the handle shaft 6 and the movable member 18 are connected with each other via the pin 17, so that the grip 19 of the handle 1 is pivotable to and away from the reel body 2. That is to say, when the screw element (not shown) is operated in the tightening direction, the portion of the movable member 18 adjacent the handle grip comes into pressure contact with a base metal 24 and at the same time the pressure-contact portion 16A of the sleeve 16 comes into pressure contact with the handle 1. On the other hand, when the screw element is operated in the loosening direction, the handle 1 is moved to its storage position with its grip 19 being pivoted towards the reel body 2.

Further, in embodying the present invention, it is conceivable to arrange the movable member detachable relative to the handle shaft. Also, the handle length adjusting mechanism can comprise e.g. a friction surface formed between the movable member and the handle. Still further, the present invention can be embodied in any other type of reel such as a baitcasting type reel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fishing reel comprising:
   a spool for winding a fishing line thereabout, and a reel body;
   a rotor rotatable about said spool to wind the fishing line on the spool;
   a drive mechanism including a handle shaft, a handle, a drive gear, a pinion gear and a cylinder shaft and operable to transmit a force from said handle to said rotor, said handle shaft having a terminal end, and a slot located at said terminal end;
   a movable member movable along an axis of said handle shaft;
   a sleeve provided on said handle shaft;
   said handle being provided between said movable member and said sleeve and being projectable and retractable relative to said movable member in a direction substantially normal to said axis of said handle shaft; and
   a handle-length adjusting mechanism including said movable member, said sleeve, said handle shaft, a pin and engagement means, said pin being connected to said movable member and inserted into said slot located at said terminal end of said handle shaft said engagement means having a projection and a concave portion both provided between portions of said movable member and said handle, and wherein said movable member and said handle press against each other, and wherein, as said handle shaft is pulled toward said reel body along said axis of said handle shaft, said handle shaft moves said pin which moves said movable member to place said movable member and sleeve in pressure-contact with said handle, and also to place said projection and said concave projecting/retracting movement of said handle relative to said handle shaft.

2. A fishing reel as defined in claim 1, wherein said projection is provided on one of said handle and said movable member while said concave portion is provided on the other of said handle and said movable member.

3. A fishing reel as defined in claim 1, wherein said handle includes a grip, and wherein release of the pulling force of said handle shaft renders said movable member and said handle pivotable about said pin to allow said grip to be pivotable toward and away from said reel body, to thereby allow said handle to be pivoted for storage.

4. A fishing reel as defined in claim 1, wherein said handle shaft includes a screw element is mounted on said handle shaft, wherein as said screw element is screwed relative to said handle shaft it pulls said handle shaft towards said reel body, said handle is brought into pressure-contact with said movable member and said sleeve, and said sleeve is pressed against said reel body, so that said handle is secured to said reel body.

5. A fishing reel comprising:
   a spool for winding a fishing line thereabout;
   a rotor rotatable about said spool to wind the fishing line on the spool;

a drive mechanism including a handle shaft, a handle, a drive gear, a pinion gear and a cylinder shaft and operable to transmit a force from said handle to said rotor;

a movable member movable along an axis of said handle shaft;

said handle being projectable and retractable relative to said movable member in a direction substantially normal to said axis; and a handle-length adjusting mechanism including said movable member and a sleeve, and means for placing said movable member and sleeve in pressure-contact with said handle, said mechanism further including engagement means located between said movable member and said handle, said engagement means including a projection and a concave portion, said reel being arranged such that the pressure-contact between said movable member, said sleeve and said handle, and the engagement between said projection and said concave portion cooperate to prevent a projecting/retracting movement of said handle: and wherein said movable member includes a pin which is inserted into a slot defined at one terminal end of said handle shaft, said movable member and said sleeve releasably securing said handle relative to said handle shaft, said means for placing said movable member and sleeve in pressure contact pulling said handle shaft towards said reel body along said axis of said handel shaft, said movable member and said handle being rendered pivotable about said pin to allow said handle to be pivoted for storage by release of the pulling force of said handle shaft.

* * * * *